(12) United States Patent
Schulte

(10) Patent No.: US 6,293,740 B1
(45) Date of Patent: Sep. 25, 2001

(54) THREADING TOOL

(75) Inventor: Paul M. Schulte, Warren, MI (US)

(73) Assignee: Northern Tool Sales and Service Company, Warren, MI (US)

( * ) Notice: Subject to any disclaimer, the term of this patent is extended or adjusted under 35 U.S.C. 154(b) by 0 days.

(21) Appl. No.: 09/387,975

(22) Filed: Sep. 1, 1999

(51) Int. Cl.[7] .............................. B23G 5/18; B23C 3/00
(52) U.S. Cl. .......................... 409/66; 409/74; 408/222; 470/198
(58) Field of Search .................... 409/65, 66, 74, 409/78; 408/222; 470/198

(56) References Cited

U.S. PATENT DOCUMENTS

| 21,960 | 11/1858 | Hickok . | |
|---|---|---|---|
| 83,371 | * 10/1868 | Foster | 470/198 |
| 371,015 | * 10/1887 | Wike | 470/198 |
| 586,419 | 7/1897 | Collet . | |
| 1,281,683 | * 10/1918 | Spinney | 470/198 |
| 1,875,362 | * 9/1932 | Wells | 408/222 |
| 2,240,840 | 5/1941 | Fischer . | |
| 2,335,741 | 11/1943 | Contaldi . | |
| 3,774,501 | 11/1973 | Brown et al. . | |
| 4,316,683 | * 2/1982 | Schott | 470/198 |
| 4,943,191 | * 7/1990 | Schmitt | 470/198 |
| 5,733,078 | * 3/1998 | Matsushita et al. | 409/74 |
| 5,873,684 | 2/1999 | Flolo . | |
| 5,902,079 | 5/1999 | Moore . | |

OTHER PUBLICATIONS

Machinery's Handbook, 25th ed., New York, 1996, pp. 1852–1854.*

* cited by examiner

Primary Examiner—A. L. Wellington
Assistant Examiner—Erica D. Ergenbright
(74) Attorney, Agent, or Firm—Brooks & Kushman P.C.

(57) ABSTRACT

The invention involves a threading tool (20) for defining an internal thread within walls (62) of a cavity (64) within a workpiece having a floor (66) around an axially disposed protuberance (68) with a top (70) extending from the floor (66). The threading tool (20) includes a first end portion (22) for gripping and a second end portion (24) for threading. Threads (30) are formed on the second end portion (24). An opening (40) is axially disposed at the second end portion (24) and extends inward to form a recess (42) and recess bottom (44) over which the threads (30) extend a distance (A), allowing internal threads to be formed along the walls (62) past the top (70) of the protuberance (68).

10 Claims, 1 Drawing Sheet

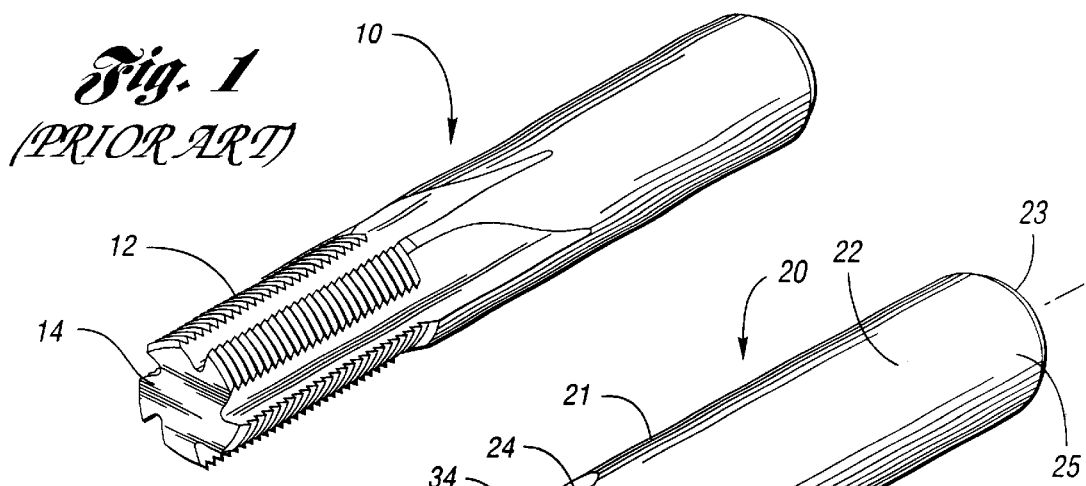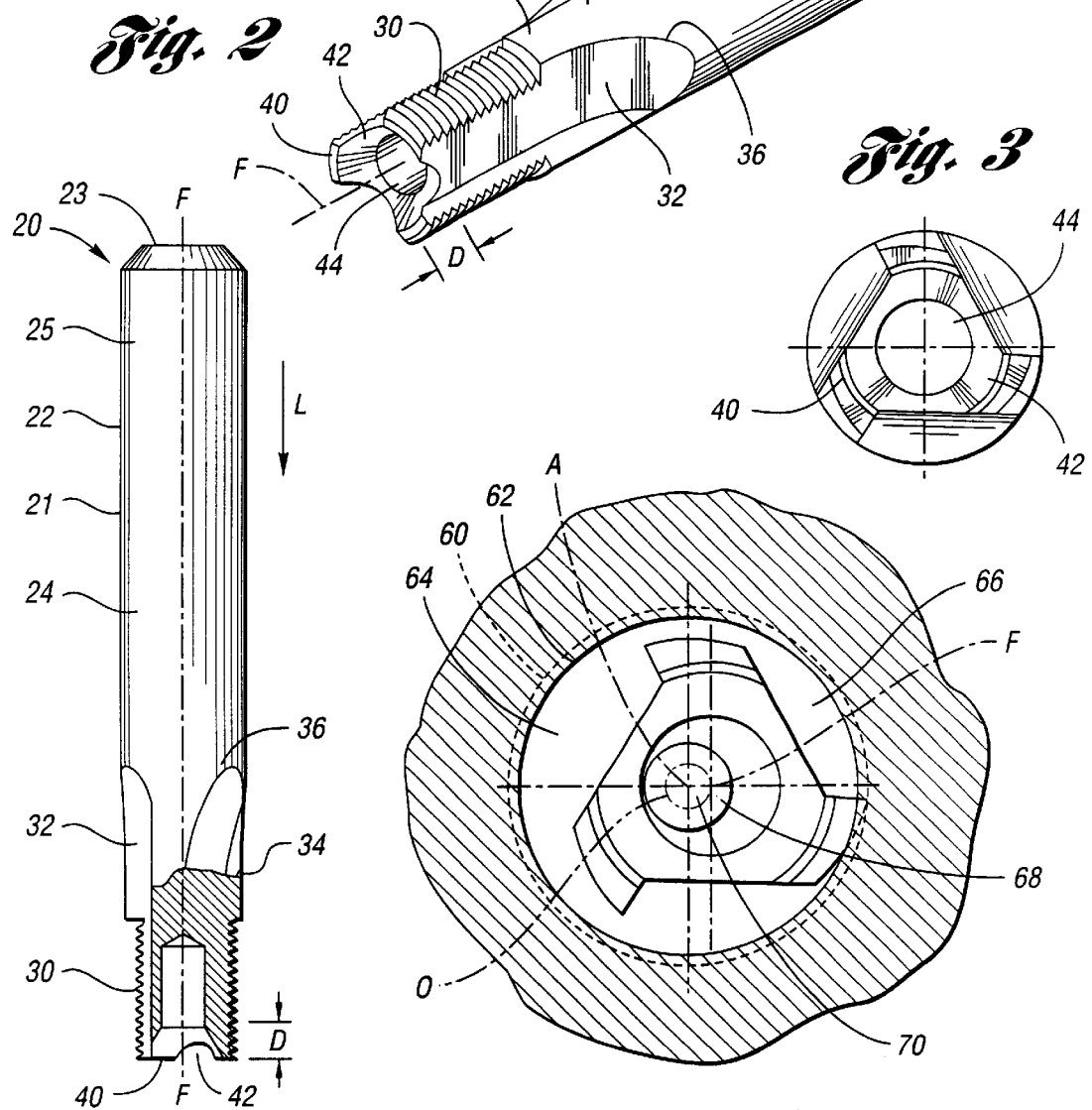

THREADING TOOL

TECHNICAL FIELD

The present invention relates to a threading tool for milling internal threads upon cavity walls of a workpiece to be threadingly secured with a male tubular fitting.

BACKGROUND ART

With the ongoing use of threaded fittings in industrial applications, internal and external threads are continuously formed to threadingly secure fittings. A number of tools are available for forming threads. For tubular fittings, a tool, such as tool 10 as depicted in FIG. 1, forms internal threads within walls of a cavity. Tool 10 is an elongated member having threads 12 formed thereon to cut or mill internal threads upon the walls (not shown) of a cavity. Thus, the internal threads may be formed and may extend along the walls of the cavity.

However, in the prior art, the axial depth along which the internal threads may extend is dependent upon the dimensions of the tool and the obstructions it may encounter. As shown in FIG. 1, tool 10 is an elongated member having a closed end 14 which enters the cavity to form internal threads upon walls of the cavity. The internal threads may extend as far as tool 10 can be inserted through the cavity. In many situations regarding tubular fittings, for example, in an anti-lock brake valve, the cavity of a female fitting has a floor around an axially disposed protuberance having a top extending upwardly from the floor, which interferes with the closed end of conventional tools.

In use, a male tubular fitting, which threadily inserts into the female tubular fitting, typically has an open end that receives the protuberance and engages with the cavity floor. When manufacturing the female fitting, the protuberance obstructs the closed end 14 of tool 10 and, in turn, limits the depth down to which internal threads may be formed and extend along the cavity walls. As a result, no internal threads may be formed past the top of the protuberance to the surface adjacent the cavity floor. Thus, a male tubular fitting is prevented from threadily attaching past the top of the protuberance of the female fitting. This tends to affect sealing integrity and allow unwanted leakage.

Although the existing cutting and milling tools may suffice in securing tubular fittings, the obstruction as described above creates an undesirable limitation which calls for an improvement to the existing tools. The absence of threads formed past the top of the protuberance to the internal surface adjacent floor of the cavity sacrifices strength in the attachment of the tubular fittings. That is, having internal threads formed past the top of the protuberance increases the strength in holding the tubular fittings together during normal environmental use, for example, in an antilock brake valve, in which the tubes engage a flared cone fitting.

Therefore, what is needed is a threading tool which forms internal threads upon cavity walls having a floor around an axially disposed protuberance having a top, wherein the internal threads extend along the walls past the top of the protuberance to the surface adjacent the floor.

DISCLOSURE OF INVENTION

Accordingly, it is an object of the present invention to provide an improved threading tool which increases strength in the attachment of tubular fittings. It is another object of the present invention to provide a threading tool which mills threads upon walls of a cavity having a floor around an axially disposed protuberance having a top extending upwardly, whereby the internal threads extend past the top to the surface adjacent the floor.

The present invention provides a threading tool comprising an elongated member which includes a threading portion. The threading portion has milling threads disposed thereon and an axial opening extending inwardly which defines a recess and a recess bottom. The threads extend an axial distance beyond the recess bottom.

The present invention also provides a method for milling an internal thread within a cavity of a workpiece. The method involves providing an elongated member having milling threads disposed at least partially adjacent an engaging end thereof. The elongated member, having an axis of rotation (F), may be secured to a mechanical driver. The method further includes providing a workpiece having a generally cylindrical cavity within the walls of which the thread is to be milled. The cavity has a longitudinal axis (A) and a floor around an axially disposed protuberance which has a top extending upwardly from the floor.

Then, the method further involves inserting the elongated member downwardly within the cavity parallel to the axis (A), displacing the member laterally within the cavity such that the milling threads engage the wall of the cavity while spinning the member around the axis of rotation (F), and moving the axis (F) within the cavity of the workpiece such that the axis (F) describes a circular orbital path within the cavity. The method further includes stopping the orbital movement of the member and displacing the member inwardly within the cavity away from the walls thereof.

In use, the tool mills internal threads upon walls of a cavity of a female tubular fitting to be threadily secured to a male tubular fitting. As the threading tool downwardly inserts in the cavity, the recess receives the protuberance while avoiding contact therewith, thereby allowing the tool to mill internal threads upon the internal surface of the cavity adjacent the floor thereof. Thus, the tool mills internal threads upon the cavity walls past the top of the protuberance.

These and other objects, features and advantages will be readily apparent upon consideration of the following detailed description in conjunction with the accompanying drawings.

BRIEF DESCRIPTION OF DRAWINGS

FIG. 1 is a perspective view of prior art related to the present invention;

FIG. 2 is a perspective view of one embodiment in accordance with the present invention;

FIG. 3 is a top view of the embodiment shown in FIG. 2;

FIG. 4 is a partial cross-sectional side view of the embodiment shown in FIG. 2; and FIG. 5 is an environmental sectional view of the embodiment of FIG. 2 in accordance with the present invention.

BEST MODE FOR CARRYING OUT THE INVENTION

FIG. 1 depicts a prior art milling tool having a closed end 14.

FIG. 2 depicts an embodiment of a threading tool 20 for defining an internal thread within cavity walls of a female tubular fitting having a floor around an axially disposed protuberance with a top extending upwardly from the floor, in accordance with the present invention. The threading tool 20 is an elongated member 21 which preferably is cylindrical. Elongated member 21 includes a first end portion 22 and a second end portion 24.

First end portion 22 has an external gripping surface 25 which is shown on FIG. 2 to have a smooth surface. First end portion 22 also includes a closed end 23. External gripping surface 25 is preferably a smooth cylindrical surface such that surface 25 may be engaged with and secured in any suitable mechanical driver. However, other shaped surfaces may be used in accordance with different connections to mechanical drivers, such as notches or polygonal shaped surfaces, without departing beyond the scope of the invention.

Second end portion 24 has threads 30 which are radially disposed thereon. In this embodiment, sections of threads 30 are spaced apart by paths 32 which axially extend along second end portion 24. As shown in FIG. 3, threads 30 are formed on a plurality of axially formed shoulders 34 which are radially spaced between paths 32. In this embodiment, three shoulders are formed on second end portion 24. As shown, paths 32 are formed at axial point 36 on second end portion 24 and radially narrow therealong providing the paths 32 with an axially arcuate shape. The arcuate shape of paths 32 allow for a less difficult direction and insertion of second end portion 24 into a cavity 64 of a female tubular fitting, as shown in FIGS. 2 and 5.

As shown in FIGS. 2–4, second end portion 24 also includes an axial opening 40 which frustoconically extends inwardly to define a recess 42, preferably frustoconically shaped, and a recess bottom 44. As shown in FIGS. 2 and 4, threads 30 axially extend a distance (D) upon recess 42.

As shown on FIG. 5, tool 20 mills internal threads 60 upon walls 62 of cavity 64 of a female tubular fitting through which a male tubular fitting (not shown) threadily attaches thereto. Cavity 64 includes a floor 66 around an axially disposed protuberance 68 having a top 70 which extends upwardly from floor 66. As shown in FIG. 5, in use, the recess 42 receives protuberance 68 while avoiding contact therewith. This allows tool 20 to mill the internal threads 60 upon the internal surface of the cavity 64 adjacent floor 68 thereof. It is to be noted that tool 20 mills internal thread 60 such that internal threads 60 extend the distance (D) below top 70 of protuberance 68.

As stated above, first end portion 22 is securable to any suitable mechanical driver. When secured thereto, tool 20 may be driven in a cavity of a female tubular fitting, such as one for an antilock brake valve.

Tool 20 is secured in any suitable mechanical driver, as stated above. With the mechanical driver, tool 20 moves in a direction of lead (L) when tool 20 initially inserts into cavity 64 of a workpiece so that it may move into engagement with walls 62 and be retracted therefrom, as shown in FIG. 4. In direction (L), tool 20 inserts downwardly within cavity 64 parallel to an axis (A), as shown in FIG. 5. Then, tool 20 is displaced radially within cavity 64 so that milling threads 30 engage walls 62 of cavity 64 while spinning tool 20 around an axis of rotation (F). Axis of rotation (F) is an axis about which tool 20 spins wherein axis of rotation (F) orbitally moves to mill internal threads 60 upon walls 62 of cavity 64.

In one embodiment, tool 20 is displaced linearly radially within cavity 64. In another embodiment, tool 20 is displaced arcuately radially within cavity 64. Being displaced arcuately radially decreases pressure against tool 20 from the initial contact with walls 62, lessening the wear on tool 20.

As shown in FIG. 5, axis of rotation (F) moves in an orbital path about an axis of orbital movement (O). Moving about axis of orbital movement (O), tool 20 also may move upwardly or downwardly parallel to axis (A). In this embodiment, tool 20 moves upwardly while milling. The degree in which tool 20 moves upwardly is in direct relationship with dimensions of milling threads 30 of tool 20. For example, a tool having a 20 pitch measurement for grooves of the milling threads results in a path having an upward movement of 0.05 inch per revolution of the tool about axis of rotation (F). Lastly, the member is stopped from moving about axis (O) and is displaced inwardly within the cavity away from the walls thereof.

In this embodiment, tool 20 is made of carbide. However, threading tool 20 may be made of a hard-cutting material such as metal, ceramic, or any other suitable material.

In use, internal threads 60 that are formed below top 70 of protuberance 68 allow for an externally threaded male tubular fitting with a frustoconically-shaped opening to be threadily attached to cavity 64 past the top 70 of protuberance 68. This allows for a more secure attachment thereto.

While embodiments of the invention have been illustrated and described, it is not intended that these embodiments illustrate and describe all possible forms of the invention. Rather, the words used in the specification are words of description rather than limitation, and that various changes may be made without departing from the spirit and scope of the invention.

What is claimed is:

1. A threading tool for milling an internal thread within a cavity of a workpiece comprising:
    an elongated member including a threading portion,
    the elongated member also having an axis of rotation (F) about which the elongated member spins, the axis of rotation (F) also describing an orbital path within the cavity of the workpiece,
    the theading portion having milling threads disposed at least partially thereon, the threading portion having an axial opening extending inwardly to define a recess and a fully enclosed recess bottom,
    the tool milling internal threads upon a wall of the cavity during orbital movement of the milling threads around a protuberance extending from a floor of the cavity, the recess of the elongated member receiving the protuberance while avoiding contact therewith, thereby allowing the tool to mill the internal threads past the protuberance adjacent the floor of the cavity.

2. The threading tool of claim 1 wherein the recess is a frustoconical recess.

3. The threading tool of claim 1 wherein the milling threads of the tool extend an axial distance along the threading portion, and the protuberance has a top, whereby the internal threads milled upon the wall of the cavity may extend an axial distance past the top of the protuberance.

4. The threading tool of claim 1 wherein the elongated member further is associated with an axis of orbital movement (O) along which the tool orbits while moving about the axis of rotation (F), and has a direction of lead (L) along which the tool initially moves to insert the tool so that the tool may move into engagement with the cavity walls and be retracted therefrom.

5. The threading tool of claim 1 wherein the threading portion further includes a plurality of axially formed shoulders radially spaced between paths, wherein the milling threads are disposed on the shoulders.

6. The threading tool of claim 5 wherein the paths are formed on a point along the threading portion and radially narrow therealong, the paths having an axially arcuate shape.

7. A threading tool for milling an internal thread within a cylindrical wall of a cavity of a workpiece having a floor around a protuberance having a top extending from the floor, the tool comprising:

an elongated member including a gripping portion and threading portion opposed thereto,
the elongated member also having an axis of rotation (F) such that the axis of rotation (F) describes an orbital path within the workpiece,
the gripping portion having a surface by which the elongated member may be displaced,
the threading portion having a threaded external surface, the threaded external surface having threaded sections disposed at least partially thereon, the treading portion having an opening axially formed therewithin, the opening extending inwardly to define a frustoconical recess and a fully enclosed recess bottom, whereby the tool mills internal threads upon the cylindrical wall of the cavity around the protuberance during orbital movement of the milling threads, the frustoconical recess of the elongated member receiving the protuberance while avoiding contact between the recess bottom and the protuberance, thereby allowing the tool to mill the internal threads within the cavity adjacent the floor thereof, the threaded sections being located past the top of the protuberance.

8. A method for milling an internal thread upon a wall within a cavity of a workpiece, the method comprising the steps of:

providing an elongated member having milling threads disposed partially adjacent an engaging end thereof, the elongated member having an axis of rotation (F), the engaging end having an opening axially formed thereon, the opening extending inwardly to define a recess and a recess bottom;

providing a workpiece having a generally cylindrical cavity within the walls of which the thread is to be milled, the cavity having a longitudinal axis (A) and a floor around an axially disposed protuberance having a top extending from the floor;

inserting the elongated member within the cavity parallel to the axis (A), the recess receiving the protuberance;

displacing the member radially within the cavity so that the milling threads engage the wall of the cavity while spinning the member around the axis of rotation (F);

moving the axis (F) within the cavity so that the axis (F) describes a circular orbital path within the cavity; and stopping orbital movement of the member after the threads are milled and displacing the member inwardly within the cavity away from the walls thereof.

9. The method of claim 8 wherein displacing the member includes displacing the member linearly radially.

10. The method of claim 8 wherein displacing the member includes displacing the member arcuately radially.

* * * * *

UNITED STATES PATENT AND TRADEMARK OFFICE
CERTIFICATE OF CORRECTION

PATENT NO. : 6,293,740 B1
DATED : September 25, 2001
INVENTOR(S) : Paul M. Schulte It is certified that error appears in the above-identified patent and that said Letters Patent is hereby corrected as shown below:

Column 5,
Line 15, delete "treading" and insert therefor -- threading --.

Signed and Sealed this

Nineteenth Day of November, 2002

Attest:

JAMES E. ROGAN
Attesting Officer  Director of the United States Patent and Trademark Office